(12) United States Patent
Kerstetter, III et al.

(10) Patent No.: US 7,371,446 B2
(45) Date of Patent: May 13, 2008

(54) HOSE CONSTRUCTION CONTAINING POLYMER COMPOSITION

(75) Inventors: Randal Howard Kerstetter, III, Wadsworth, OH (US); Arthur Joseph Culham, Nottawa (CA)

(73) Assignee: Veyance Technologies, Inc., Fairlawn, OH (US)

( * ) Notice: Subject to any disclaimer, the term of this patent is extended or adjusted under 35 U.S.C. 154(b) by 0 days.

(21) Appl. No.: 10/680,767

(22) Filed: Oct. 7, 2003

(65) Prior Publication Data
US 2004/0071911 A1 Apr. 15, 2004

(51) Int. Cl.
*B29D 22/00* (2006.01)
*B29D 23/00* (2006.01)
*B32B 1/08* (2006.01)

(52) U.S. Cl. ............... 428/36.9; 428/36.91; 428/36.92; 428/500

(58) Field of Classification Search ............... 428/36.9, 428/36.91, 36.92, 35, 7, 500; 525/170, 192, 525/194, 222; 526/318, 328.5
See application file for complete search history.

(56) References Cited

U.S. PATENT DOCUMENTS

| | | | | |
|---|---|---|---|---|
| 3,873,494 | A | * 3/1975 | Lewis | 524/147 |
| 3,976,610 | A | * 8/1976 | Morris et al. | 525/124 |
| 4,309,332 | A | 1/1982 | Fischer et al. | 260/40 R |
| 4,710,544 | A | 12/1987 | Wolfe, Jr. | 525/194 |
| 4,759,388 | A | 7/1988 | Kiyama et al. | 138/130 |
| 5,250,644 | A | 10/1993 | Tokunaga et al. | 526/318 |
| 5,274,035 | A | 12/1993 | Chundury | 525/92 |
| 5,492,971 | A | 2/1996 | Williams | 525/194 |
| 5,601,889 | A | 2/1997 | Chundury et al. | 428/34.3 |
| 5,683,773 | A | 11/1997 | Kemper | 428/36.91 |
| 5,942,577 | A | 8/1999 | Venkataswamy | 525/148 |
| 6,329,463 | B1 | 12/2001 | Abraham et al. | 525/92 |

FOREIGN PATENT DOCUMENTS

| | | |
|---|---|---|
| DE | 199 15314 A1 | 10/2000 |
| EP | 0 370 361 A2 | 5/1990 |
| EP | 0 653 457 A2 | 5/1995 |
| EP | 0 870 800 A1 | 10/1998 |

OTHER PUBLICATIONS

Database WPI, Section Ch, Week 199950, Derwent Publications Ltd., Class A18, AN-1999-586052, XP002267682; and JP 11 255971 A (Abstract) Sep. 21, 1999.
Patent Abstracts of Japan, vol. 2002, No. 04, (Aug. 4, 2002); and JP 2001 342308 A (Abstract).
Rubber Division Papers, Fall 1999, Orlando Florida, Paper #187—"The Use Of Enhanced Viscosity Ethylene Vinyl Acetate Polymers For Extruded Goods Applications"—Dale R. Keller, Lynn A. Bryant, John A. Dewar.

* cited by examiner

*Primary Examiner*—Michael C. Miggins
(74) *Attorney, Agent, or Firm*—Wood, Herron & Evans, LLP

(57) ABSTRACT

The present invention relates to an automotive hose having at least one rubber layer comprising from about 60 to about 95 parts by weight of ethylene vinyl acetate (EVM), and from about 5 to about 40 parts by weight of polyacrylic rubber (ACM).

17 Claims, 1 Drawing Sheet

HOSE CONSTRUCTION CONTAINING POLYMER COMPOSITION

BACKGROUND OF THE INVENTION

Elastomeric compounds useful in the fabrication of automotive hoses include chlorinated polyethylene, chlorosulfonated polyethylene and epichlorohydrin elastomers as disclosed for example in U.S. Pat. No. 5,683,773. Compounds made using these polymers possess good mechanical properties, low compression set, good low temperature flexibility, and good dynamic fatigue resistance. These compounds also exhibit excellent aging, weathering, chemical and ozone resistance due to their saturated backbones, and the polarity contributed by the chlorine and ether components provide good oil swell resistance.

Newer specifications for automotive hose compounds require air and oil resistance at temperatures of up to 175° C. Compounds comprising chlorinated polyethylene and chlorosulfonated polyethylene compounds cannot be used at these higher temperatures. Copolymers and terpolymers of ethylene and alkyl acrylates are useful as hose compounds at higher temperatures, but are expensive to use.

U.S. Pat. No. 4,759,388 discloses a hose comprising inner and outer tubes of an acrylic rubber. The acrylic rubber may be acrylic acid lower alkyl ester alone, or the ester as a main component polymerized with copolymerizable monomer under the presence of a crosslinking agent. The acrylic rubber may be a copolymer comprising acrylic acid lower alkyl ester as a main component and ethylene and vinyl acetate as copolymer components. The crosslinking agent may be an acrylic acid derivative having one of carboxyl group, epoxy group and chlorine atoms, or a methacrylic acid derivative.

European Patent No. 0370361 discloses soft, elastic polymer mixtures based on crosslinked, particulate alkyl acrylate rubbers and hydrolyzed ethylene vinyl acetate copolymers.

U.S. Pat. No. 5,274,035 discloses ethylene vinyl acetate compositions and medical tubing made therefrom. The compositions comprise a major amount of ethylene vinyl acetate and a minor amount of one or more other polymers. The other polymers may include a terpolymer of an alpha olefin, an acrylic ester, and an olefinically unsaturated dicarboxylic acid, such as ethylene/methyl acrylate/maleic anhydride. Suitable ethylene vinyl acetate comprises from about 5 to about 50 percent by weight of vinyl acetate.

U.S. Pat. No. 5,492,971 discloses a curable ethylene copolymer blend composition which is a blend of an ethylene dipolymer, an ionomer of an ethylene unsaturated acid copolymer, and a peroxide curing agent. The ethylene dipolymer may be ethylene vinyl acetate. The ionomer may be ethylene/methyl acrylate/ethyl hydrogen maleate.

Paper No. 187 presented at the meeting of the Rubber Division, American Chemical Society, Orlando, Fla., Sep. 21 through 24, 1999, discloses the use of ethylene vinyl acetate in compounds suitable for use in automotive hoses. The ethylene vinyl acetate compounds disclosed utilize enhanced viscosity ethylene vinyl acetate that has been partially crosslinked via peroxide or radiation. The ethylene vinyl acetate compounds therein are shown to have superior high temperature property retention as compared with compounds of chlorosulfonated polyethylene or ethylene/methyl acrylate terpolymer.

SUMMARY OF THE INVENTION

The present invention relates to an automotive hose having at least one rubber layer comprising from about 60 to about 95 parts by weight of EVM, and from about 5 to about 40 parts by weight of ACM.

DETAILED DESCRIPTION OF THE INVENTION

Figure 1:
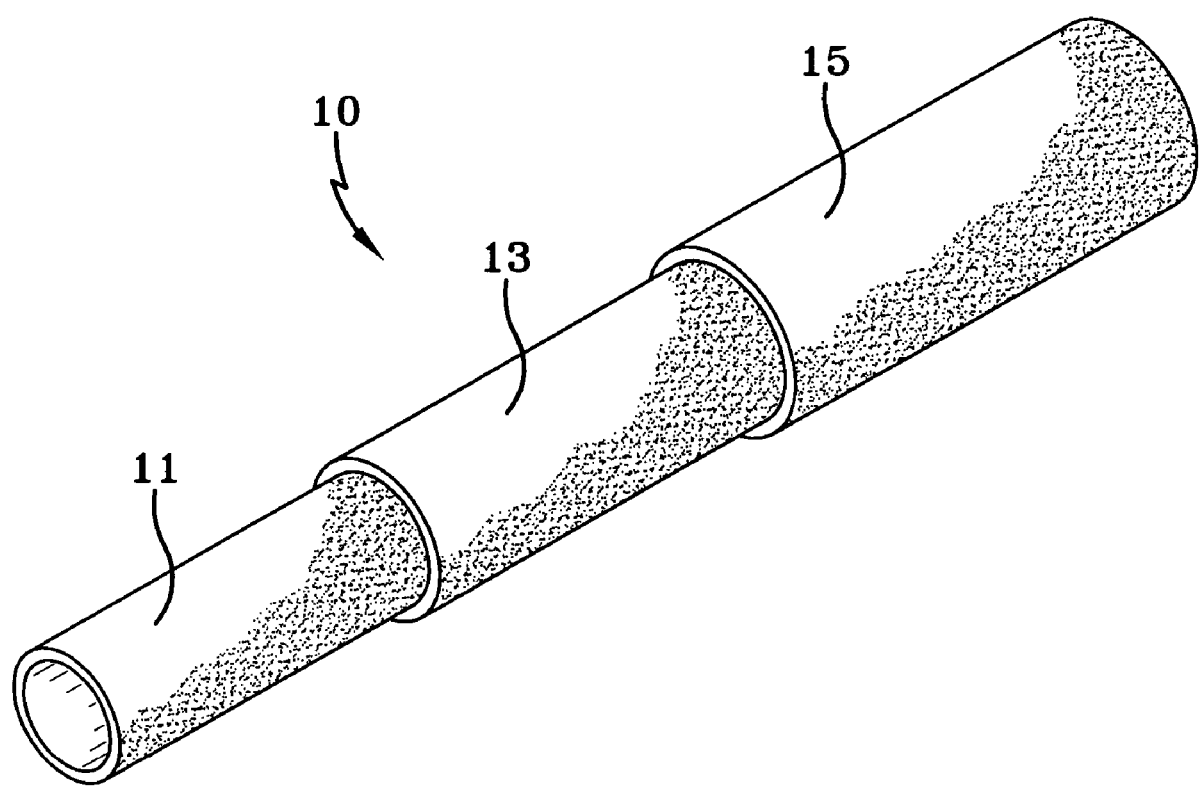
FIG. 1 is a perspective view of a hose according to the invention.

When a hose, for example, as shown in FIG. 1 is produced, one or more components may be formed from a polymer composition comprising a copolymer of ethylene and vinyl acetate (ethylene vinyl acetate, or EVM), and a crosslinkable polyacrylic rubber (ACM).

Ethylene vinyl acetate suitable for use in the composition may be produced by methods as are known in the art, for example, as taught in U.S. Pat. Nos. 5,093,450, 5,089,579 or 5,135,988. Suitable EVM contains from about 40 to about 80 percent by weight of vinyl acetate. In one embodiment, the EVM contains from about 50 to about 70 percent by weight of vinyl acetate. Suitable EVM is available from various commercial sources, including DuPont, Millennium Petrochemicals, Nova-Borealis Compounds LLC, AT Plastics Inc., Exxon, ATO Chem, Bayer AG, and others. In one embodiment, the EVM is of the Levapren series from Bayer. The EVM may be present in the composition in an amount ranging from about 60 to about 95 parts by weight. Alternatively, the EVM may be present in a range from about 70 to about 90 parts by weight, alternatively, from about 80 to about 90 parts by weight.

Crosslinkable polyacrylic rubber suitable for use in the composition may be produced by methods as are known in the art, for example, as taught in U.S. Pat. No. 5,250,644. Crosslinkable polyacrylic rubber is also known in the art as ACM, acrylic-based elastomer, alkylacrylate copolymer, poly(alkyl acrylate), poly[(1-alkoxy carbonyl)ethylene], or polyacrylate rubber. Suitable ACM may be produced by free radical polymerization of any of the acrylic acid esters which have been usually used in the preparation of acrylic rubbers. Representative examples of the acrylic acid esters are, for instance, an alkyl acrylate such as methyl acrylate, ethyl acrylate, butyl acrylate or 2-ethylhexyl acrylate, an alkoxyalkyl acrylate such as methoxyethyl acrylate, and the like. Alkyl acrylates having a C1 to C8 alkyl group and alkoxyalkyl acrylates having a C2 to C8 alkoxyalkyl group wherein the alkoxy group has 1 to 4 carbon atoms are generally used. These acrylic acid esters may be used alone or in admixture thereof. In one embodiment, the ACM is a copolymer of ethyl acrylate, butyl acrylate, and methoxyethyl acrylate.

ACM is typically copolymerized with cure site comonomers to impart a cross-linkability. For example, acrylic acid esters are copolymerized with halogen-containing cure site monomers such as 2-chloroethyl vinyl ether and vinyl chloroacetate, epoxy monomers such as allyl glycidyl ether, glycidyl acrylate and glycidyl methacrylate, or alkylacrylic acid derivatives, so that the obtained acrylic rubbers can be crosslinked with a crosslinking agent or curing agent, e.g. a fatty acid soap or an amine compound such as ethyltetramine or tetraethylpentamine. Carboxylate type cure site monomers may also be used, as well as dual cure site monomers, for example, halogen-containing monomers and carboxylate monomers in the same ACM. In one embodiment, the ACM contains vinyl chloroacetate as a cure site monomer.

Suitable ACM is available commercially from several sources, including Hytemp 4053EP having a Mooney viscosity ML (1+4) @ 100° C. ranging from 23 to 31, Nipol AR74 having a Mooney viscosity ML (1+4) @ 100° C. ranging from 29 to 36, Nipol AR72HF having a Mooney viscosity ML (1+4) @ 100° C. ranging from 43 to 53, and the like. ACM may be used in the composition in a range of from about 5 to about 40 parts by weight. Alternatively, ACM may be used in a range of from about 10 to about 30 parts by weight; alternatively from about 10 to about 20 parts by weight.

EVM and ACM thus together make up 100 parts by weight of rubber as used in the composition. Additional components as may be added to the composition are referred to on a parts per hundred rubber basis (phr), based on the 100 parts of EVM and ACM.

In addition to EVM and ACM, the rubber composition may contain conventional additives including reinforcing agents, fillers, pigments, accelerators, antiozonants, antioxidants, processing oils, activators, initiators, plasticizers, waxes, pre-vulcanization inhibitors, extender oils and the like.

Representative of reinforcing agents include carbon black, which is typically added in amounts ranging from about 5 to 200 parts by weight based on 100 parts by weight of total rubber (phr). In one embodiment, carbon black is used in amounts ranging from about 10 to about 120 phr; in another embodiment carbon black is used in a range of from about 35 to about 90 phr. Typical carbon blacks that are used include N110, N330, N332, N472, N550, N630, N642, N650, N762, N770, N907, N908, N990 and N991.

The commonly employed siliceous pigments which may be used in the rubber composition include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the Journal of the American Chemical Society, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, 532 EP etc; silicas available from Rhodia, with, for example, designations of Z1165MP and Z165GR and silicas available from Degussa AG with, for example, designations VN2 and VN3, etc.

Other fillers which may be used include talc, clay, calcium carbonate, and the like. Other fillers may be used in an amount ranging from about 5 to 150 phr. Oil dispersions containing such fillers may also be used.

Organosilanes such as 3,3'bis(triethoxysilylpropyl) tetrasulfide may be used in amounts ranging from 0.1 to 20 phr. Suitable examples of such organosilanes are disclosed in U.S. Pat. No. 4,128,438 incorporated herein by reference in its entirety. Representative of the antidegradants which may be in the rubber composition include microcrystalline wax, paraffinic wax, monophenols, bisphenols, thiobisphenols, polyphenols, hydroquinone derivatives, phosphites, phosphate blends, thioesters, naphthylamines, diphenol amines, substituted and unsubstituted diaryl amine derivatives, diarylphenylenediames, para-phenylene diamines, quinolines and blended amines. Antidegradants are generally used in an amount ranging from about 0.1 phr to about 10 phr with a range of from about 2 to 6 phr being preferred. Representative of processing oils which may be used in the rubber composition of the present invention include activated dithio-bisbenzanilide, poly-para-dinitrosobenzene, xylyl mercaptans, aliphatic-naphthenic aromatic resins, polyethylene glycol, petroleum oils, ester plasticizers, vulcanized vegetable oils, pine tar, phenolic resins, synthetic oils, petroleum resins, polymeric esters and rosins. These processing oils may be used in a conventional amount ranging from about zero to about 140 phr. The rubber layer may contain magnesium oxide in conventional amounts. However, it has been found that the presence of magnesium oxide in the rubber layer may be detrimental to adhesion and/or bleeding of the hose components. Therefore, in a preferred embodiment, the rubber layer does not contain magnesium oxide. These additives are conventionally used in amounts ranging from 0.1 to 25 phr.

The elastomeric compositions for use in the coating layer can be crosslinked by various peroxide containing curing agents. Curing agents which may be employed in the compositions of the invention include, for example, di-tert-butyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, benzoyl peroxide, 2,5-dimethyl-2,5-(t-butyl peroxy)-hexane, 1,1-ditertbutyl peroxy-3,3,5-trimethyl cyclohexane, 4,4-ditert-butyl peroxy n-butyl valerate and n-butyl-4,4-bis(t-butyl peroxy) valerate. Additional curing agents which may be employed include diacyl or dialkyl peroxides such as α,α'-bis(t-butylperoxy)-isopropylbenzene, 2,5-Dimethyl-2,5-di(t-butylperoxy) hexane, Di-t-butyl peroxide, 2,5-Dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di (benzoylperoxy)-hexane and benzoyl peroxide. All of the above curing agents are commercially available.

The amount of curing agent that is used may vary. Generally speaking, the level will range of from 0.1 to 15 phr (based on active parts of peroxide). Preferably, the level ranges from 2 to 10 phr.

Crosslinking co-agents may be added to the rubber composition. Representative examples of such co-agents include triallyl cyanurate, triallyl isocyanurate, triallyl phosphate, triallyl trimellitate, diallylidene pentaerithryte, diallyl terephthalate, tetraallyl oxyethane, triallyl citrate, acetyl triallyl oxyethane, acetyl triallyl citrate, di-, tri-, tetra- and penta-functional acrylates, di-, tri-, tetra- and penta-functional methacrylates, n,n'-m-phenylene-dimaleimide, 1,2-cis-polybutadiene and mixtures thereof. Typical amounts of such co-agents range from 1 to 20 phr. Preferred ranges of co-agents include of from 2 to 10 phr.

The mixing of the rubber composition can be accomplished by methods known to those having skill in the rubber mixing art. For example, the ingredients may be mixed in one stage but are typically mixed in at least two stages, namely at least one non-productive stage followed by a productive mix stage. The final curatives including vulcanizing agents are typically mixed in the final stage which is conventionally called the "productive" mix stage in which the mixing typically occurs at a temperature, or ultimate temperature, lower than the mix temperature(s) than the preceding non-productive mix stage(s).

Curing of the rubber composition is generally carried out at conventional temperatures ranging from about 160° C. to 190° C. Preferably, the curing is conducted at temperatures ranging from about 170° C. to 180° C.

The compositions may be used in the fabrication of hoses and the like such as hoses useful in automotive applications. The compositions may be extruded or otherwise fabricated as one or more layers of a single or multi-layered hose. Other layers in the hose may be fabricated from materials as are known in the art.

Referring now to FIG. 1, a transmission oil cooler hose 10 constructed according to one embodiment of the present invention is shown. The hose 10 comprises an inner layer 11, a reinforcement layer 13 overlaying and preferably adhered to the inner layer 11, and an outer cover layer 15 overlaying and preferably adhered to the reinforcement layer 13. The reinforcement layer 13 is formed of a suitable reinforcement material which may include organic or inorganic fibers or brass-plated steel wires. The reinforcement material is preferably an organic fiber material, such as nylon, polyester, aramid, cotton or rayon. The reinforcement construction may be of any suitable type such as braid, spiral, knit or wrapped, but in the embodiment shown, is of a braid construction. The reinforcement may further be treated with a sizing such as an RFL-type treatment to promote adhesion between the reinforcement and the inner and outer layers.

The inner layer 11 may consist of multiple elastomeric layers which may or may not be of the same composition, however in the preferred embodiment shown, the entire inner layer is made of the composition of the present invention.

The elastomeric outer cover layer 15 is made of suitable materials designed to withstand the exterior environment encountered. In the preferred embodiment shown, the outer cover layer 15 is made of the rubber composition of the present invention.

Other embodiments may be envisioned, including hose constructions having multiple reinforcement layers and multiple elastomeric layers. One or more of the elastomeric layers may comprise the composition of the present invention.

The following examples are provided to illustrate the instant invention and are not intended to limit the same. All parts are parts by weight, unless listed otherwise.

EXAMPLE I

In this Example, rubber compositions comprising a blend of EVM and ACM were compared to rubber compositions comprising a blend of EVM and Vamac G, identified as a terpolymer of ethylene, methyl acrylate, and a cure site monomer. Compounds were made following the compositions indicated in Table 1. Physical properties were evaluated as indicated in Tables 2. In this and subsequent Examples, testing was done using the following protocols. Tensile tests were done following ASTM D412. Die C tear tests were done following ASTM D624. Compression Set B tests were done following ASTM D395. Volume Swell tests were done following ASTM D471, using IRM 903 fluid, or modified to use Dexron III transmission oil cooler (TOC) fluid.

TABLE 1

| | Samples | | | | | | | |
|---|---|---|---|---|---|---|---|---|
| Materials | 1 | 2 | 3 | 4 | 5 | 6 | 7 | 8 |
| EVM (Levapren 600) | 70 | 70 | 70 | 70 | 70 | 70 | 70 | 70 |
| AEM (Vamac G) | 30 | 30 | 30 | 30 | 0 | 0 | 0 | 0 |
| ACM | 0 | 0 | 0 | 0 | 30 | 30 | 30 | 30 |
| Carbon black N550 | 40 | 40 | 20 | 20 | 40 | 40 | 20 | 20 |
| Carbon black N990 | 20 | 20 | 40 | 40 | 20 | 20 | 40 | 40 |
| Hard clay | 20 | 40 | 20 | 40 | 20 | 40 | 20 | 40 |
| Silane coupling agent | 0.5 | 1 | 0.5 | 1 | 0.5 | 1 | 0.5 | 1 |
| Octyldecyl Amine | 1 | 1 | 1 | 1 | 1 | 1 | 1 | 1 |
| Calcium Stearate | 4 | 4 | 4 | 4 | 4 | 4 | 4 | 4 |
| LMW Polyethylene | 1 | 1 | 1 | 1 | 1 | 1 | 1 | 1 |
| 50% polycarbodiimide | 3 | 3 | 3 | 3 | 3 | 3 | 3 | 3 |
| Hydroquinoline | 0.5 | 0.5 | 0.5 | 0.5 | 0.5 | 0.5 | 0.5 | 0.5 |
| MgO (Maglite D) | 5 | 0 | 0 | 5 | 5 | 0 | 0 | 5 |
| Peroxide (Dicup 40KE) | 8 | 8 | 8 | 8 | 8 | 8 | 8 | 8 |
| Triallyl cyanurate | 2.5 | 2.5 | 2.5 | 2.5 | 2.5 | 2.5 | 2.5 | 2.5 |

TABLE 2

| | Samples | | | | | | | |
|---|---|---|---|---|---|---|---|---|
| Properties | 1 | 2 | 3 | 4 | 5 | 6 | 7 | 8 |
| Original Properties | | | | | | | | |
| Tensile strength (MPa) | 14.9 | 15.9 | 14.6 | 14.9 | 12.7 | 13.0 | 11.4 | 11.3 |
| Elongation at break (%) | 200 | 130 | 184 | 123 | 124 | 134 | 136 | 145 |

TABLE 2-continued

| Properties | \multicolumn{8}{c}{Samples} | | | | | | | |
| --- | --- | --- | --- | --- | --- | --- | --- | --- |
| | 1 | 2 | 3 | 4 | 5 | 6 | 7 | 8 |
| Shore A hardness | 85 | 86 | 79 | 85 | 79 | 84 | 76 | 82 |
| Tear strength (N/mm) | 23.2 | 27.6 | 23.9 | 27.7 | 21.7 | 23.9 | 19.5 | 17.9 |
| Compression set B, 70 Hours at 150° C. | | | | | | | | |
| % Set | 37 | 38 | 40 | 39 | 33 | 27 | 37 | 33 |
| Air Aged, 70 Hours at 175° C. | | | | | | | | |
| Tensile strength (MPa) | 15.0 | 17.6 | 15.2 | 16.4 | 13.6 | 13.7 | 12.5 | 12.5 |
| Elongation at break (%) | 118 | 78 | 116 | 122 | 124 | 88 | 164 | 119 |
| Air Aged, 168 Hours at 175° C. | | | | | | | | |
| Tensile strength (MPa) | 15.4 | 16.0 | 14.2 | 15.4 | 12.3 | 12.3 | 12.2 | 12.2 |
| Elongation at break (%) | 97 | 67 | 94 | 74 | 79 | 57 | 110 | 85 |
| Shore A hardness | 84 | 86 | 80 | 85 | 83 | 84 | 75 | 82 |
| Oil Immersed (IRM 903), 168 Hours at 150° C. | | | | | | | | |
| Tensile strength (MPa) | 9.4 | 10.6 | 10.2 | 8.8 | 7.7 | 7.7 | 8.0 | 7.4 |
| Elongation at break (%) | 102 | 91 | 127 | 73 | 88 | 72 | 119 | 82 |
| Shore A hardness | 57 | 62 | 52 | 58 | 57 | 56 | 50 | 57 |
| Volume swell (%) | 60 | 52 | 58 | 55 | 54 | 46 | 52 | 47 |
| Oil Immersed (TOC), 168 Hours at 150° C. | | | | | | | | |
| Tensile strength (MPa) | 10.8 | 12.9 | 11.4 | 11.4 | 8.6 | 9.4 | 9.4 | 8.9 |
| Elongation at break (%) | 128 | 105 | 154 | 99 | 113 | 104 | 147 | 126 |
| Shore A hardness | 66 | 71 | 58 | 71 | 63 | 67 | 59 | 64 |
| Volume swell (%) | 27 | 23 | 26 | 26 | 24 | 21 | 22 | 22 |
| Oil Immersed (TOC), 168 Hours at 175° C. | | | | | | | | |
| Tensile strength (MPa) | 12.6 | 13.0 | 10.4 | 10.6 | 10.4 | 9.8 | 9.5 | 8.5 |
| Elongation at break (%) | 80 | 101 | 141 | 76 | 118 | 127 | 166 | 120 |
| Shore A hardness | 71 | 62 | 55 | 66 | 59 | 54 | 51 | 58 |
| Volume swell (%) | 30 | 30 | 33 | 30 | 27 | 25 | 27 | 26 |

As seen in the data of Table 2, EVM (Levapren 600HV) can be blended with AEM and ACM to produce compounds capable of handling air agings and immersions at temperatures of up to 175° C. AEM blends provide slightly higher tensile and modulus values while ACM blends were slightly better for oil resistance, retained elongation, and compression set.

EXAMPLE II

In this Example, rubber compositions comprising a blend of EVM and ACM were compared to rubber compositions comprising EVM with no added ACM. Compounds were made following the compositions indicated in Tables 3A and 3B. Physical properties were evaluated as indicated in Tables 4A and 4B.

TABLE 3A

| Materials | \multicolumn{8}{c}{Samples} | | | | | | | |
| --- | --- | --- | --- | --- | --- | --- | --- | --- |
| | 9 | 10 | 11 | 12 | 13 | 14 | 15 | 16 |
| EVM, Levapren 600 HV, 60% vinyl acetate | 100 | 100 | 100 | 100 | 90 | 90 | 90 | 90 |
| ACM, Nipol AR72HF, Cl cure site | 0 | 0 | 0 | 0 | 10 | 10 | 10 | 10 |
| N550 | 10 | 10 | 30 | 30 | 10 | 10 | 30 | 30 |
| N990 | 40 | 40 | 40 | 40 | 40 | 40 | 40 | 40 |
| Armeen 18D | 1 | 1 | 1 | 1 | 1 | 1 | 1 | 1 |
| Calcium stearate | 4 | 4 | 4 | 4 | 4 | 4 | 4 | 4 |
| Low MW polyethylene | 1 | 1 | 1 | 1 | 1 | 1 | 1 | 1 |
| Polycarbodiimide | 3 | 0 | 0 | 3 | 3 | 0 | 0 | 3 |
| TMQ | 0.5 | 0 | 0 | 0.5 | 0.5 | 0 | 0 | 0.5 |
| Irganox 1010, CIBA | 0 | 2 | 2 | 0 | 0 | 2 | 2 | 0 |
| DLTDP, Struktol | 0 | 1 | 1 | 0 | 0 | 1 | 1 | 0 |
| MgO | 0 | 2 | 2 | 0 | 2 | 0 | 0 | 2 |
| Dicup peroxide, 265F auto-initiation | 8 | 8 | 8 | 8 | 8 | 8 | 8 | 8 |
| triallyl cyanurate | 2.5 | 0 | 2.5 | 0 | 2.5 | 0 | 2.5 | 0 |
| SR521, Sartomer | 0 | 2 | 0 | 2 | 0 | 2 | 0 | 2 |

TABLE 3B

| Materials | Samples | | | | | | | |
|---|---|---|---|---|---|---|---|---|
| | 17 | 18 | 19 | 20 | 21 | 22 | 23 | 24 |
| EVM, Levapren 600 HV, 60% VA | 80 | 80 | 80 | 80 | 70 | 70 | 70 | 70 |
| ACM, Nipol AR72HF, Cl cure site | 20 | 20 | 20 | 20 | 30 | 30 | 30 | 30 |
| N550 | 10 | 10 | 30 | 30 | 10 | 10 | 30 | 30 |
| N990 | 40 | 40 | 40 | 40 | 40 | 40 | 40 | 40 |
| Armeen 18D | 1 | 1 | 1 | 1 | 1 | 1 | 1 | 1 |
| Calcium stearate | 4 | 4 | 4 | 4 | 4 | 4 | 4 | 4 |
| Low MW polyethylene | 1 | 1 | 1 | 1 | 1 | 1 | 1 | 1 |
| Polycarbodiimide | 0 | 3 | 3 | 0 | 0 | 3 | 3 | 0 |
| TMQ | 0 | 0.5 | 0.5 | 0 | 0 | 0.5 | 0.5 | 0 |
| Irganox 1010, CIBA | 2 | 0 | 0 | 2 | 2 | 0 | 0 | 2 |
| DLTDP, Struktol | 1 | 0 | 0 | 1 | 1 | 0 | 0 | 1 |
| MgO | 0 | 2 | 2 | 0 | 2 | 0 | 0 | 2 |
| Dicup peroxide, 265F auto-initiation | 8 | 8 | 8 | 8 | 8 | 8 | 8 | 8 |
| triallyl cyanurate | 2.5 | 0 | 2.5 | 0 | 2.5 | 0 | 2.5 | 0 |
| SR521, Sartomer | 0 | 2 | 0 | 2 | 0 | 2 | 0 | 2 |

SR521—Sartomer difunctional acrylate co-agent (proprietary)
TMQ—trimethyl dihydroquinoline
Irganox 1010—Tetrakis [methylene (3, 5-di-t-butyl-4-hydroxyhydrocinnamate)] methane
DLTDP—dilauryl thiodipropionate

TABLE 4A

| Properties | Samples | | | | | | | |
|---|---|---|---|---|---|---|---|---|
| | 9 | 10 | 11 | 12 | 13 | 14 | 15 | 16 |
| Original Properties | | | | | | | | |
| Tensile strength (MPa) | 15.0 | 11.8 | 14.4 | 14.7 | 14.3 | 11.3 | 15.5 | 14.0 |
| Elongation at break (%) | 177 | 408 | 193 | 269 | 160 | 383 | 173 | 246 |
| Shore A hardness | 62 | 60 | 74 | 71 | 64 | 58 | 73 | 71 |
| Tear strength (N/mm) | 16 | 29 | 23 | 33 | 16 | 23 | 23 | 28 |
| Compression Set B, 70 Hours at 150° C. | | | | | | | | |
| % Set | 7 | 11 | 15 | 11 | 12 | 11 | 13 | 14 |
| Air Aged, 70 Hours at 175° C. | | | | | | | | |
| Tensile strength (MPa) | 14.6 | 11.8 | 15.6 | 13.4 | 13.8 | 12.1 | 15.0 | 13.6 |
| Elongation at break (%) | 193 | 361 | 160 | 253 | 169 | 311 | 148 | 226 |
| Shore A hardness | 67 | 62 | 77 | 75 | 66 | 60 | 76 | 75 |
| Air Aged, 168 Hours at 175° C. | | | | | | | | |
| Tensile strength (MPa) | 13.5 | 6.9 | 7.4 | 11.3 | 10.5 | 9.6 | 12.4 | 13.4 |
| Elongation at break (%) | 171 | 136 | 51 | 146 | 110 | 164 | 87 | 168 |
| Shore A hardness | 68 | 63 | 78 | 75 | 69 | 62 | 76 | 75 |
| Oil Immersed (IRM 903), 168 Hours at 150° C. | | | | | | | | |
| Tensile strength (MPa) | 7.8 | 6.5 | 9.6 | 9.0 | 8.2 | 6.4 | 9.1 | 8.4 |
| Elongation at break (%) | 115 | 259 | 130 | 187 | 116 | 238 | 119 | 166 |
| Shore A hardness | 50 | 33 | 55 | 46 | 52 | 33 | 53 | 48 |
| Volume swell (%) | 69.9 | 91.2 | 63.43 | 73.73 | 60.62 | 80.97 | 61.56 | 65.37 |
| Oil Immersed (TOC), 168 Hours at 150° C. | | | | | | | | |
| Tensile strength (MPa) | 9.5 | 8.6 | 12.1 | 10.7 | 9.5 | 7.9 | 11.8 | 10.2 |
| Elongation at break (%) | 155 | 373 | 186 | 245 | 152 | 324 | 178 | 224 |
| Shore A hardness | 53 | 41 | 59 | 54 | 55 | 43 | 57 | 54 |
| Volume swell (%) | 35 | 39 | 31.9 | 35.3 | 30.1 | 35 | 29.6 | 30.7 |
| Oil Immersed (TOC), 168 Hours at 175° C. | | | | | | | | |
| Tensile strength (MPa) | 11.2 | 9.6 | 11.6 | 10.8 | 11.5 | 9.1 | 12.4 | 11.1 |
| Elongation at break (%) | 203 | 426 | 212 | 258 | 178 | 328 | 193 | 234 |
| Shore A hardness | 47 | 38 | 49 | 46 | 50 | 41 | 49 | 46 |
| Volume swell (%) | 38 | 45 | 39 | 40 | 34 | 41 | 33 | 35 |

TABLE 4B

| Properties | \multicolumn{8}{c}{Samples} |
| --- | --- | --- | --- | --- | --- | --- | --- | --- |
|  | 17 | 18 | 19 | 20 | 21 | 22 | 23 | 24 |
| Original Properties |  |  |  |  |  |  |  |  |
| Tensile strength (MPa) | 12.0 | 11.9 | 13.1 | 10.4 | 11.6 | 10.7 | 13.2 | 10.6 |
| Elongation at break (%) | 210 | 288 | 157 | 373 | 226 | 320 | 142 | 311 |
| Shore A hardness | 61 | 61 | 74 | 64 | 61 | 56 | 73 | 65 |
| Tear strength (N/mm) | 17 | 21 | 20 | 31 | 14 | 17 | 17 | 25 |
| Compression Set B, 70 Hours at 150° C. |  |  |  |  |  |  |  |  |
| % Set | 21 | 27 | 23 | 27 | 36 | 35 | 25 | 35 |
| Air Aged, 70 Hours at 175° C. |  |  |  |  |  |  |  |  |
| Tensile strength (MPa) | 12.9 | 11.3 | 12.8 | 11.0 | 11.5 | 10.2 | 13.6 | 11.1 |
| Elongation at break (%) | 195 | 249 | 157 | 282 | 205 | 271 | 136 | 221 |
| Shore A hardness | 62 | 60 | 76 | 69 | 64 | 59 | 76 | 72 |
| Air Aged, 168 Hours at 175° C. |  |  |  |  |  |  |  |  |
| Tensile strength (MPa) | 7.5 | 10.8 | 12.2 | 7.6 | 8.3 | 8.4 | 12.6 | 11.3 |
| Elongation at break (%) | 92 | 195 | 116 | 102 | 100 | 169 | 98 | 131 |
| Shore A hardness | 66 | 63 | 75 | 72 | 66 | 60 | 74 | 72 |
| Oil Immersed (IRM 903), 168 Hours at 150° C. |  |  |  |  |  |  |  |  |
| Tensile strength (MPa) | 7.2 | 5.6 | 7.7 | 5.7 | 4.8 | 4.9 | 7.0 | 5.9 |
| Elongation at break (%) | 150 | 176 | 112 | 245 | 129 | 197 | 97 | 195 |
| Shore A hardness | 41 | 37 | 53 | 30 | 36 | 33 | 53 | 35 |
| Volume swell (%) | 65 | 68 | 58 | 82 | 69 | 70 | 51 | 71 |
| Oil Immersed (TOC), 168 Hours at 150° C. |  |  |  |  |  |  |  |  |
| Tensile strength (MPa) | 8.4 | 6.7 | 9.6 | 7.7 | 7.7 | 6.5 | 9.0 | 7.8 |
| Elongation at break (%) | 204 | 223 | 142 | 339 | 202 | 248 | 128 | 272 |
| Shore A hardness | 47 | 44 | 56 | 39 | 42 | 38 | 57 | 44 |
| Volume swell (%) | 30 | 31 | 30 | 34 | 33 | 31 | 25 | 33 |
| Oil Immersed (TOC), 168 Hours at 175° C. |  |  |  |  |  |  |  |  |
| Tensile strength (MPa) | 10.1 | 8.7 | 11.5 | 8.7 | 8.6 | 8.2 | 10.5 | 9.2 |
| Elongation at break (%) | 247 | 257 | 166 | 388 | 210 | 287 | 148 | 277 |
| Shore A hardness | 45 | 44 | 50 | 37 | 43 | 35 | 51 | 46 |
| Volume swell (%) | 35 | 35 | 33 | 40 | 34 | 34 | 27 | 35 |

In almost all cases tensile strength was reduced as the ACM content increased, however even at a level of 30 phr the values were sufficient for typical specifications. Modulus values also slightly decreased with increasing ACM. Compression set was heavily influenced by ACM content in that those compounds containing no ACM averaged 11 percent, while those containing 30 phr averaged 33 percent. Volume swells in both IRM903 and TOC fluid both decreased with increasing ACM content.

The addition of ACM to these EVM compounds provides increased resistance to volume swell and slightly lower Tg, however other properties such as tensile strength and compression set are negatively impacted. A good balance between these properties was observed when the ACM was in the 10 to 20 phr range.

While certain representative embodiments and details have been shown for the purpose of illustrating the invention, it will be apparent to those skilled in this art that various changes and modifications may be made therein without departing from the spirit or scope of the invention.

What is claimed is:

1. An automotive hose comprising at least one rubber layer comprising:
   (A) from about 60 to about 95 parts by weight of EVM; and
   (B) from about 5 to about 40 parts by weight of ACM having a Mooney viscosity ML (1+4) @ 100° C. in a range selected from the group consisting of 23 to 31, 29 to 36, and 43 to 53.

2. The hose of claim 1, wherein said rubber layer comprises from about 80 to about 90 parts by weight of EVM and from about 10 to about 20 parts by weight of ACM.

3. The hose of claim 1, wherein said rubber layer comprises from about 70 to about 90 parts by weight of EVM and from about 10 to about 30 parts by weight of ACM.

4. The automotive hose of claim 1 wherein said EVM comprises from about 40 to about 80 percent vinyl acetate.

5. The automotive hose of claim 1 wherein said EVM comprises from about 50 to about 70 percent vinyl acetate.

6. The automotive hose of claim 1 wherein said ACM is a copolymer comprising ethyl acrylate, butyl acrylate, methoxyethyl acrylate, and a cure site monomer.

7. The automotive hose of claim 1 wherein said rubber layer further comprises from about 10 to about 120 phr of carbon black.

8. The automotive hose of claim 1 wherein said rubber layer further comprise from about 35 to about 90 phr of carbon black.

9. The automotive hose of claim 1 wherein said rubber layer is peroxide cured.

10. The automotive hose of claim 1 wherein said rubber layer comprises from about 70 to about 90 parts of EVM comprising from about 50 to about 70 percent of vinyl acetate, and from about 30 to about 10 parts of ACM comprising ethyl acrylate, butyl acrylate, methoxy ethyl acrylate, and a cure site monomer.

11. The automotive hose of claim 1 wherein the ACM has a Mooney viscosity ML (1+4) @ 100° C. ranging from 23 to 31.

12. The automotive hose of claim 1 wherein the ACM has a Mooney viscosity ML (1+4) @ 100° C. ranging from 29 to 36.

13. The automotive hose of claim 1 wherein the ACM has a Mooney viscosity ML (1+4) @ 100° C. ranging from 43 to 53.

14. The automotive hose of claim 1 wherein said ACM comprises one or more monomers selected from the group consisting of C1-C8 alkyl acrylates and C2-C8 alkoxy C1-C8 alkyl acrylates.

15. The automotive hose of claim 14 wherein said ACM further comprises at least one cure site monomer.

16. The automotive hose of claim 15 wherein said halogen containing monomer is vinyl chloroacetate or 2-chloroethyl vinyl ether.

17. The automotive hose of claim 14 wherein said ACM further comprises at least one cure site monomer selected from the group consisting halogen-containing cure site monomers, epoxy monomers and carboxylate type cure site monomers.

* * * * *